J. C. BACKUS.
AUTOMOBILE HEADLIGHT.
APPLICATION FILED JUNE 22, 1916.

1,223,657.

Patented Apr. 24, 1917.
2 SHEETS—SHEET 1.

Inventor
John C. Backus
By
Attorneys

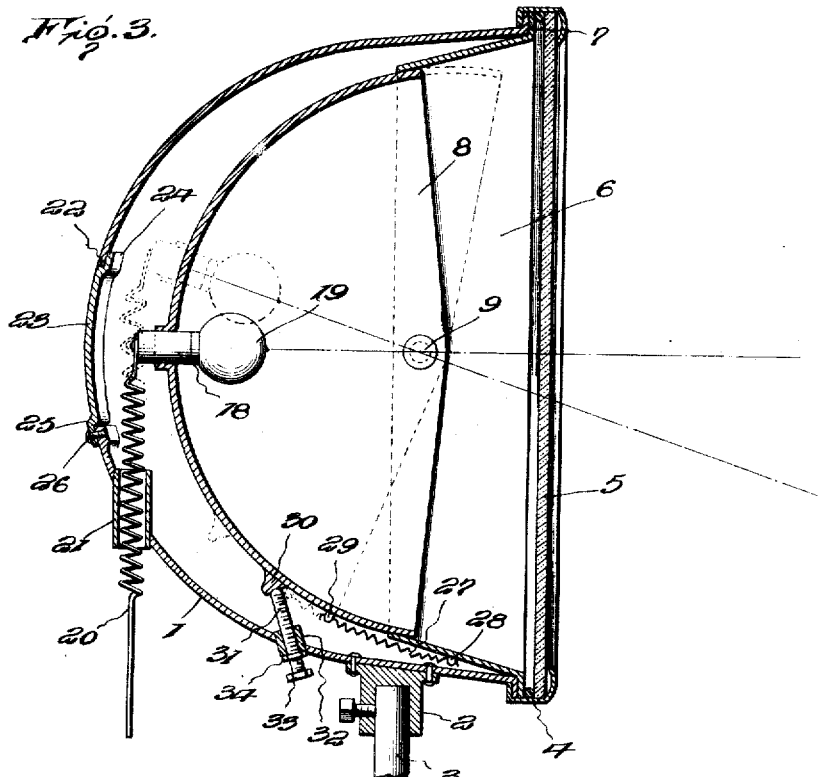

UNITED STATES PATENT OFFICE.

JOHN CLAYTON BACKUS, OF SMETHPORT, PENNSYLVANIA.

AUTOMOBILE-HEADLIGHT.

1,223,657.   Specification of Letters Patent.   Patented Apr. 24, 1917.

Application filed June 22, 1916. Serial No. 105,255.

*To all whom it may concern:*

Be it known that I, JOHN CLAYTON BACKUS, a citizen of the United States, residing at Smethport, in the county of McKean and State of Pennsylvania, have invented certain new and useful Improvements in Automobile-Headlights, of which the following is a specification.

This invention relates to automobile headlights and has as its object to provide an automobile headlight having a reflector including a movable section which may be turned about a horizontal axis so as to cause the light rays to be reflected downwardly onto the road surface, thereby preventing the blinding glare from the headlight confusing the driver of an approaching machine and also enabling the driver of the machine equipped with the headlight embodying the present invention, having full view of the road surface immediately in front of the machine which he is driving so that he may avoid striking ruts or ditches in the said road surface.

Another aim of the invention is to so construct the operating means for the reflector of the headlight that after the reflector has been turned so as to reflect the rays in a downward direction, and the operating mechanism is released, the said reflector will be returned to its normal position automatically.

Another aim of the invention is to provide means whereby the operator may initially determine the normal position assumed by the movable reflector section of the headlight so that under normal driving conditions the rays may be reflected in a downward direction at a slight angle or directly forwardly as may suit the convenience of the driver of the machine.

In the accompanying drawings,—

Fig. 3 is a vertical front to rear sectional view through one of the headlights, the said view illustrating in full lines the normal position of the movable reflector section and in dotted lines one of the positions which the said section may assume when it is adjusted to reflect the rays in a downward direction;

Fig. 4 is a view, partly in top plan and partly in horizontal section, illustrating a pair of the headlights and the connecting means between the movable reflector sections thereof.

Figure 1:
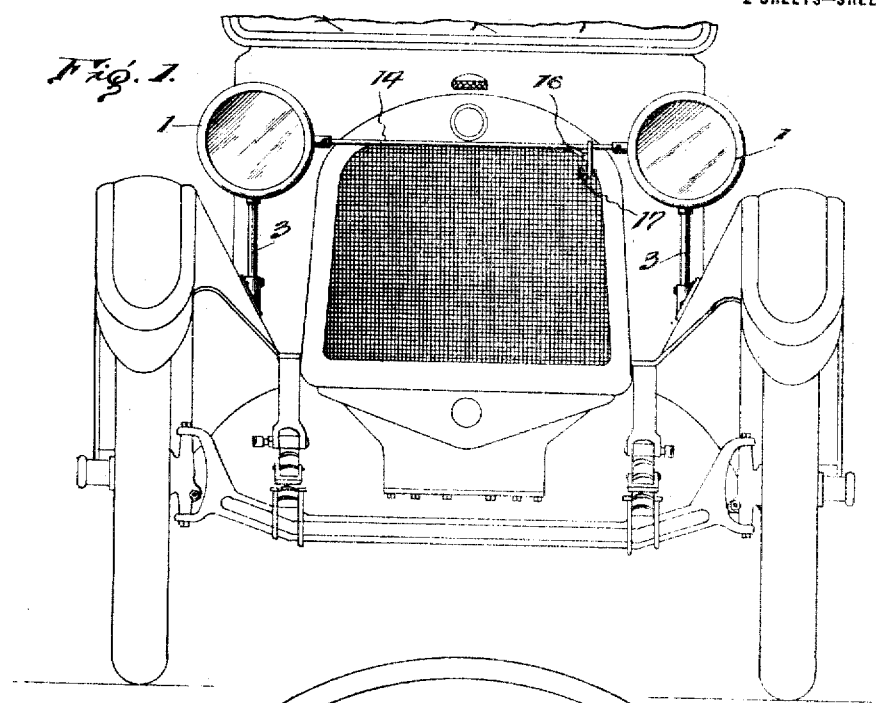
Figure 1 is a front elevation of an automobile equipped with a pair of headlights constructed in accordance with the present invention.
Figure 2:
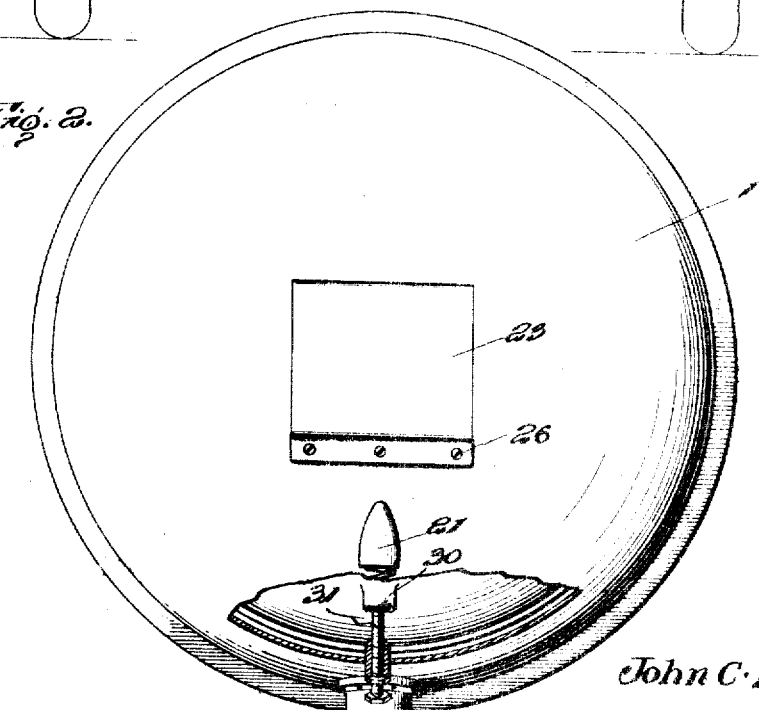
Fig. 2 is a rear elevation of one of the headlights, parts being broken away and parts being shown in section.

While the principles of the present invention may be embodied in a single headlight mounted at any convenient point upon the machine, the present invention illustrates the manner of employing a pair of headlights located one at each side at the front of the machine and having their movable reflector sections connected for operation in unison. Inasmuch as the headlights are of counterpart construction, a specific description of one will suffice for both.

The headlight embodying the present invention includes a casing shell which is indicated in general by the numeral 1 and which is substantially of hollow semispherical form and this casing shell is provided at its underside with a socket 2 receiving the upper end of a supporting standard 3 which is mounted at any convenient point upon the frame of the machine. The numeral 4 indicates a rim which surrounds the open front of the casing shell 1 and this rim serves as a support or frame for the lens of the headlight which is indicated by the numeral 5.

The reflector of the headlight includes a fixed section which is indicated by the numeral 6 and which is substantially of frustoconical form and is arranged within the forward portion of the casing shell 1 with its major end foremost and is provided at its said end with a circumscribing flange 7 which abuts against the edge of the open forward side of the casing shell and is held fixedly in place by means of the said rim 4, as clearly shown in Fig. 3 of the drawings. The reflector further includes a movable or adjustable section which is indicated by the numeral 8 and is substantially of hollow semi-spherical form. The forward open side of this section is of a diameter to fit substantially snugly within the minor end of the fixed reflector section 6 although the section 8 may have movement upon its mountings which will be presently described, within the said end of the fixed section. In mounting the movable section within the minor end of the fixed section, a pivot 9 is fitted through the sides of the sections 6 and 8 which are the outer sides when the headlight is in place upon the machine and, in horizontal alinement with the pivot 9, a pivot 10 is fitted through the walls of the said sections and is, of course, located diametrically opposite the pivot 9. The pivots 9 and 10 are located relatively close to the rear edge of the section 6 and relatively close to the forward edge of the wall of the section 8. Furthermore, the pivots 9 and 10 are concentric to the arc described by the reflector section 8 in front to rear vertical section and, therefore, the section may be tilted or turned within the minor end of the section 6 without such movement being interfered with by the said section 6. The pivot 10 is provided with an extension 11 which projects through and a short distance beyond the casing shell 1 and to this projecting portion of the pivot there is fitted one end of a sleeve 12 secured in place by a set screw 13. Fitted into the opposite end of the sleeve 12 is a connecting rod 14 secured in place by means of a set screw 15 and this rod 14 extends transversely of the front of the machine and, in a sense of the word, between the two pivots 10. It will be understood that the pivots 10 are fixed with relation to the respective reflector sections 8 and have free rotary movement in the respective reflector sections 6 and casing shells 1. Therefore, when the connecting rod 14 is oscillated, the reflector sections 8 will be correspondingly oscillated or rocked in unison and to the same degree. In order that the rod 14 may be oscillated, as above stated, it is provided at any suitable point in its length with a crank arm 16 to which is connected an operating wire or rod 17 which extends rearwardly to any suitable operating device, such as a lever, (not shown) mounted upon the dash or any other convenient part of the machine.

The numeral 18 indicates an electric lamp socket which is suitably mounted centrally in the back of the reflector section 8 and the numeral 19 indicates an electric lamp bulb which is fitted into the said socket 18. A conductor wire 20 leads to the socket 18 and is passed freely through a sleeve 21 arranged within the rear portion of the casing shell 1. In order that access may be had to the lamp socket 18 the casing shell 1 is provided in its rear side with an opening 22 into which is fitted a closure 23 provided at its upper edge with an offset flange 24 designed to rest against the inner side of the said casing shell at the upper side of the opening 22 and at its lower edge provided with a flange 25 designed to rest against the outer or rear face of the casing shell 1 at the lower side of the said opening. A set screw 26 is fitted through the flange 25 and into a threaded socket in the casing shell and serves to retain the closure 23 in place. It will be understood at this point that the peculiar disposition of the flanges 24 and 25 will prevent entrance of water into the casing shell.

In order that the reflector section 8 may be normally and yieldably held in a predetermined position so that the light rays will be reflected forwardly either directly or at a slight downward angle, a spring 27 is connected at one end, as at 28, to the lower side of the reflector section 6 and at its other end, as at 29, to the underside of the reflector section 8, and in order, further, that the movement of the reflector section 8 under the influence of the spring 27 may be limited, a stop 30 is provided upon the under side of the section 8 and is designed to abut against the inner end of an adjusting screw 31 fitted through a suitable bearing 32 in the underside of the casing shell 1 and provided at its outer end with a polygonal head 33 to permit of ready adjustment of the said screw 31. A jam nut 34 is fitted to the screw and is designed to be tightened to bear against the bearing 32 whereby to hold the screw in adjusted position.

From the foregoing description of the invention it will be understood that by moving the connection 17, oscillatory motion may be imparted to the connecting rod 14 for the purpose of simultaneously rocking the reflector sections 8 and that such movement of the sections, as, for example to the dotted line position shown in Fig. 3 of the drawings, will be against the tension of the spring 27. Of course, when the sections are moved, as stated and shown in dotted lines in Fig. 3, the light rays will be reflected downwardly on to the road surface. After having passed an oncoming machine, or after obstructions in the road surface have been passed and it is desired to again have the light rays reflected directly forwardly, the operating lever to which the member 17 is connected is released and the springs 27 will automatically return the sections 8 to the full line position shown in Fig. 3, or to such position that the abutment lugs 30 will strike against the ends of the adjusting screws 31. In the full line position of the reflector section 8, shown in Fig. 3 of the drawings, the light rays will be reflected directly forwardly, but should it be desired to reflect these rays downwardly at a slight angle, the abutment screws 31 may be adjusted so as to tilt the said reflector sections 8 to the desired degree.

Having thus described the invention, what is claimed as new is:

1. In a headlight, a casing, a reflector mounted within the casing for turning movement, means operable to turn the reflector in one direction, means tending to turn the reflector in the opposite direction, and adjustable means disposed between and carried by the reflector and the casing for limiting the turning movement of the reflector in the last-mentioned direction.

2. In a headlight, a casing, a reflector mounted within the casing for turning movement, means tending to turn the reflector in one direction, an abutment upon the said reflector, an adjustable abutment screw carried by the casing for coaction with the abutment, and means operable to turn the reflector in the opposite direction.

3. In a headlight, a casing, a reflector section mounted fixedly in the front end of the casing, a movable reflector section disposed in the rear portion of the casing and having its front end disposed within and pivoted to the rear end of the first-mentioned reflector section, means connected to the two reflector sections tending to normally hold the movable section in a set position, means between the casing and the movable section for varying said set position and means for turning the movable section.

4. In a headlight, a support, a reflector mounted thereon for tilting movement, means tending to tilt the reflector in one direction, means for tilting the reflector in the opposite direction, and coacting abutment elements upon the reflector and support for limiting the tilting movement of the reflector in the first-mentioned direction, one of said elements being adjustable.

In testimony whereof I affix my signature.

JOHN CLAYTON BACKUS. [L. S.]